United States Patent
Adkins et al.

(10) Patent No.: US 12,421,868 B2
(45) Date of Patent: Sep. 23, 2025

(54) SHAFT FOR A GAS TURBINE ENGINE

(71) Applicant: ROLLS-ROYCE plc, London (GB)

(72) Inventors: Russell Adkins, Derby (GB); Mark Spruce, Derby (GB); Christopher D. Jones, Chippenham (GB); Stephen C. Drew, Tamworth (GB)

(73) Assignee: Rolls-Royce plc

( * ) Notice: Subject to any disclaimer, the term of this patent is extended or adjusted under 35 U.S.C. 154(b) by 0 days.

(21) Appl. No.: 18/814,893

(22) Filed: Aug. 26, 2024

(65) Prior Publication Data
US 2025/0092799 A1    Mar. 20, 2025

(30) Foreign Application Priority Data

Sep. 20, 2023 (GB) ..................................... 2314412

(51) Int. Cl.
| | |
|---|---|
| *F16D 1/10* | (2006.01) |
| *F01D 5/02* | (2006.01) |
| *F01D 25/00* | (2006.01) |

(52) U.S. Cl.
CPC ............. *F01D 25/00* (2013.01); *F01D 5/026* (2013.01); *F05D 2230/60* (2013.01); *F05D 2240/60* (2013.01); *F05D 2300/603* (2013.01); *F16C 2326/06* (2013.01); *F16D 2001/103* (2013.01)

(58) Field of Classification Search
CPC . F16D 2001/103; F01D 5/026; F16C 2326/06
See application file for complete search history.

(56) References Cited

U.S. PATENT DOCUMENTS

| | | | | |
|---|---|---|---|---|
| 5,601,493 A | * | 2/1997 | Nakazono | ............... F16C 3/026 464/181 |
| 8,047,919 B2 | * | 11/2011 | Arden | ....................... F16D 1/02 72/713 |
| 10,415,645 B2 | * | 9/2019 | Katayama | ............... F16D 1/116 |
| 10,711,828 B2 | * | 7/2020 | Boveroux | ............... B29C 53/56 |

(Continued)

FOREIGN PATENT DOCUMENTS

| | | |
|---|---|---|
| EP | 3234388 A1 | 10/2017 |
| JP | H0968214 A | 3/1997 |

OTHER PUBLICATIONS

Great Britain search report dated Mar. 6, 2024, issued in GB Patent Application No. 2314412.4.

*Primary Examiner* — Justin D Seabe
(74) *Attorney, Agent, or Firm* — Barnes & Thornburg

(57) ABSTRACT

A shaft for a gas turbine engine includes a composite tube including a plurality of grooves extending along a longitudinal axis of the shaft. The shaft has a load fuse mechanism that has at least one metallic coupling that has a plurality of splines extending along the longitudinal axis of the shaft. Each of the plurality of splines is received within and engages with a corresponding groove of the composite tube to form a preloaded interference fit between the load fuse mechanism and the composite tube. The at least one metallic coupling includes a first portion defining a first diameter and a second portion extending from the first portion along the longitudinal axis. The second portion defines a second diameter that is greater than the first diameter. The second portion has a smooth annular outer surface devoid of any splines.

18 Claims, 9 Drawing Sheets

(56) References Cited

U.S. PATENT DOCUMENTS

| | | |
|---|---|---|
| 2002/0195291 A1* | 12/2002 | Nonogaki ............... F16D 3/387 |
| | | 180/337 |
| 2003/0157988 A1* | 8/2003 | Nonogaki ............... F16D 1/072 |
| | | 464/181 |
| 2006/0016181 A1 | 1/2006 | Giberson et al. |
| 2006/0040753 A1 | 2/2006 | Kai et al. |
| 2018/0080387 A1 | 3/2018 | Boniface et al. |
| 2018/0080504 A1 | 3/2018 | Boniface |
| 2018/0180104 A1 | 6/2018 | Huber et al. |
| 2019/0170012 A1 | 6/2019 | Yadav et al. |

* cited by examiner

SHAFT FOR A GAS TURBINE ENGINE

CROSS-REFERENCE TO RELATED APPLICATIONS

This specification is based upon and claims the benefit of priority from United Kingdom patent application number GB 2314412.4 filed on Sep. 20, 2023, the entire contents of which is incorporated herein by reference.

BACKGROUND

Technical Field

The present disclosure relates to a gas turbine engine, and in particular, to a shaft for a gas turbine engine and a method of manufacturing a shaft for a gas turbine engine.

Description of the Related Art

A gas turbine engine includes various shafts to transmit a torque between one or more components of the gas turbine engine. For example, a mainline shaft may transmit torque between a fan and a turbine of the gas turbine engine. The mainline shaft may be subjected to various types of loads during operation of the gas turbine engine. For example, the mainline shaft may be subjected to a limit load that may include the highest load that could be generated during normal operation of the gas turbine engine. Further, the mainline shaft may be subjected to an ultimate load that may include a maximum load that could be generated during a fan blade off event or a fan seizure event, which may result in increase in application of high amounts of torque and bending load.

Generally, the mainline shaft is made of steel and is designed to survive limit loads with no detrimental effect. In some cases, when the mainline shafts are subjected to limit loads, the mainline shaft may plastically deform, and torques and bending loads in excess of the limit load may be transferred to one or more surrounding components.

Further, when the mainline shafts are subjected to the ultimate load, the mainline shaft may get damaged and may disintegrate. However, it is desirable to retain a form and a structure of the mainline shaft to prevent a release of high energy debris and separation of the mainline shaft. Following an ultimate load event, it may be desirable that the mainline shaft continues to withstand windmill loads without failure, while preventing separation/misalignment of mating parts which might release debris. Moreover, due to a nature of the ultimate load, and variations in materials and dimensions of the mainline shaft, it may be difficult to predict a magnitude of the bending load being passed on to mating parts and a surrounding architecture of the mainline shaft. In order to meet the requirements for the ultimate load event that dictates large magnitude loads to be within the strength of the mainline shaft, it is required that the ultimate load needs to be within a strength of the mainline shaft, that may eventually lead to increase in weight of the mainline shaft, the mating parts, and the surrounding architecture of the mainline shaft. However, such a technique may increase an overall weight, complexity, and cost associated with the gas turbine engine.

SUMMARY

In a first aspect, there is provided a shaft for a gas turbine engine. The shaft includes a composite tube including a plurality of grooves extending along a longitudinal axis of the shaft. The shaft further includes a load fuse mechanism including at least one metallic coupling. The at least one metallic coupling includes a plurality of splines extending along the longitudinal axis of the shaft. Each of the plurality of splines is received within and engages with a corresponding groove of the composite tube to form a preloaded interference fit between the load fuse mechanism and the composite tube. The at least one metallic coupling includes a first portion defining a first diameter and a second portion extending from the first portion along the longitudinal axis. The second portion defines a second diameter that is greater than the first diameter. The second portion has a smooth annular outer surface devoid of any splines. Each of the plurality of splines projects radially outwards from the first portion. A circumferential pitch defined between two adjacent splines of the plurality of splines is from 200% to 2000% of a radial height of each of the plurality of splines.

The preloaded interference fit between the load fuse mechanism and the composite tube may be designed to withstand a fuse load. The fuse load may be defined as a load that is higher than a limit load but less than an ultimate load. When the shaft experiences the fuse load, the composite tube may slide by indexing past a spline on the metallic coupling. Thus, due to the design of the shaft, a failure that may generate due to the limit load and the ultimate load may not propagate into a remainder of the shaft, which may in turn prevent separation/failure of the shaft and potential release of debris. The preloaded interference fit between the load fuse mechanism and the composite tube may protect mating parts associated with the shaft and a surrounding architecture of the shaft from the ultimate load.

Further, the preloaded interference fit between the metallic coupling and the composite tube may retain a structural integrity of the shaft by sliding/indexing of the composite tube with respect to the metallic coupling. The preloaded interference fit may also maintain an axial capability of the shaft and may prevent a frictional effect that may be caused due to sliding of the composite tube past the metallic coupling.

Further, a value of the fuse load is a design characteristic of the preloaded interference fit at an interface of the composite tube and the metallic coupling. The remainder of the composite tube, the metallic coupling, the mating parts, and the surrounding architecture of the shaft only need to react to the fuse load and not the ultimate load. Such reduced load requirements may result in weight saving across the composite tube, the metallic coupling, the mating parts, and the surrounding architecture of the shaft, which may in turn reduce raw material costs for each component as well as an overall weight of the gas turbine engine.

With the design of the shaft described herein; it is also possible to decouple any axial restraint mechanism from the shaft. Thus, an axial capability of the shaft would remain unaffected and there would be no continued rubbing or frictional effects after a fuse load event. Further, the load fuse mechanism may enhance an efficiency of the gas turbine engine. The combination of the composite tube with the metallic coupling may provide a lightweight shaft and a stiffer alternative to a conventional all steel driveshaft.

The splines engage with corresponding groove of the metallic tube by the preloaded interference fit, such that during the fuse load event, the composite tube may slide by indexing past a spline on the metallic coupling, thereby retaining the structural integrity of the shaft.

In some embodiments, each of the plurality of splines extends longitudinally along a length of the first portion. The interface between the composite tube and the metallic coupling are in the form of the splines machined into the metallic coupling. The splines are an interference fit with the grooves of the composite tube. The interface may be machined to size allowing a desired level of interference and therefore the preloaded interference fit may be controlled accurately. The preloaded interference fit may have a high impact on a torque carrying capability of the interface. When subjected to the fuse load, the composite tube may slip over the spline of the metallic coupling, while maintaining the structural integrity of the shaft other than a relatively small amount of wear at the interface.

In some embodiments, each of the plurality of splines is equidistantly spaced apart from each other along a circumference of the first portion. Such an arrangement may allow each spline to re-lock with the corresponding groove when the composite tube slides past the spline during the fuse load event.

In some embodiments, each of the plurality of splines defines a first side surface and a second side surface extending angularly from the first side surface. The first side surface extends along a first direction that is disposed at a first spline angle relative to a tangent to the first portion. The second side surface extends along a second direction that is disposed at a second spline angle relative to a tangent to the first portion. Each of the first spline angle and the second spline angle lies from 15 degrees to 75 degrees.

The first side surface, the second side surface, the first spline angle, and the second spline angle may allow the composite tube to slide smoothly over the plurality of splines of the metallic coupling during the fuse load event.

In some embodiments, the first side surface defines a first length along the first direction. The second side surface defines a second length along the second direction. The first length is equal to the second length. Thus, each spline has a symmetric profile which may allow the composite tube to slide smoothly over the plurality of splines of the metallic coupling during the fuse load event. Further, as the splines have the symmetric profile, the shaft may be rotatable in any direction.

In some embodiments, each of the plurality of the splines extends from an outer surface of the first portion and each of the plurality of grooves extends from an inner surface of the composite tube, such that the at least one metallic coupling is received within the composite tube.

During the fuse load event, the composite tube may slide past the splines extending from the outer surface of the first portion of the metallic coupling, to prevent disintegration of the shaft.

In some embodiments, each of the plurality of the splines extends from an inner surface of the first portion and each of the plurality of grooves extends from an outer surface of the composite tube, such that the composite tube is received within the at least one metallic coupling.

During the fuse load event, the composite tube may slide past the spline extending from the inner surface of the first portion of the at least one metallic coupling to prevent disintegration of the shaft.

The circumferential pitch may be decided so as to ensure that shear loads generated by torque transmission does not cause failure of the composite tube at the interface.

In some embodiments, the radial height of each of the plurality of splines is at least 0.1 millimetre (mm). The radial height of the plurality of splines may be decided such that the composite tube may easily slide over the splines during the fuse load event.

In some embodiments, the radial height of each of the plurality of splines is from 0.1% to 5% of the first diameter of the first portion. This feature of the splines may control the additional strain that the composite tube needs to withstand when passing over the splines.

In some embodiments, the radial height of each of the plurality of splines is from 0.5% to 25% of a radial thickness of the composite tube. This feature of the splines may control a local bending strain that the composite tube needs to withstand when passing over the splines.

In some embodiments, the at least one metallic coupling is made of steel or titanium. The metallic coupling may be made of any other metal that exhibits high strength and maintains its structural integrity when subjected to high loads.

In some embodiments, the composite tube is made of a carbon composite material or a glass fibre composite material. The design of the composite tube described herein may work with carbon composite, glass fibre composite, or any other composites, where electrical isolation or galvanic protection is needed.

In some embodiments, a shape of each of the plurality of grooves is complementary to a cross-sectional shape of each of the plurality of splines. The shape of each of the plurality of splines and the plurality of grooves may allow suitable preloaded interference fit between the metallic coupling and the composite tube.

In some embodiments, each of the plurality of splines has a triangular cross-section. The triangular shape of the each of the plurality of splines may allow radial movement of the composite tube relative to the metallic coupling.

In some embodiments, the at least one metallic coupling includes a plurality of metallic couplings spaced apart from each other relative to the longitudinal axis of the shaft. Each of the plurality of splines of each of the plurality of metallic couplings is received within and engages with the corresponding groove of the composite tube to form the preloaded interference fit between the load fuse mechanism and the composite tube.

In an example, the shaft may include a pair of metallic couplings disposed at either ends of the composite tube. In another example, the shaft may include a pair of metallic couplings that may be spaced apart from either ends of the composite tube. Each metallic coupling may maintain the structural integrity of the shaft during fuse load events.

In a second aspect, there is provided a gas turbine engine including the shaft of the first aspect. The gas turbine engine may have a reduced overall weight and may be cost-effective in terms of manufacturing and serviceability.

In a third aspect, there is provided a method of manufacturing a shaft for a gas turbine engine. The method includes providing a composite tube including a plurality of grooves extending along a longitudinal axis of the shaft. The method further includes providing a load fuse mechanism including at least one metallic coupling. The at least one metallic coupling includes a plurality of splines extending along the longitudinal axis of the shaft. The method further includes receiving each of the plurality of splines within a corresponding groove of the composite tube, such that each of the plurality of splines engages with the corresponding groove. The method further includes forming a preloaded interference fit between the load fuse mechanism and the composite tube upon engagement of each of the plurality of splines with the corresponding groove of the composite tube.

The preloaded interference fit between the load fuse mechanism and the composite tube may be designed to withstand the fuse load. When the shaft experiences the fuse load, the composite tube may slide by indexing past the spline on the metallic coupling. Thus, due to the design of the shaft, the failure that may generate due to the limit load and the ultimate load may not propagate into the remainder of the shaft, which may in turn prevent separation/failure of the shaft and potential release of debris. The preloaded interference fit between the load fuse mechanism and the composite tube may protect mating parts associated with the shaft and the surrounding architecture of the shaft from the ultimate load.

Further, the preloaded interference fit between the metallic coupling and the composite tube may retain the structural integrity of the shaft by sliding/indexing of the composite tube with respect to the metallic coupling. The preloaded interference fit may also maintain the axial capability of the shaft and may prevent the frictional effect that may be caused due to sliding of the composite tube past the metallic coupling.

Further, the value of the fuse load is a design characteristic of the preloaded interference fit at the interface of the composite tube and the metallic coupling. The remainder of the composite tube, the metallic coupling, the mating parts, and the surrounding architecture of the shaft only need to react to the fuse load and not the ultimate load. Such reduced load requirements may result in weight saving across the composite tube, the metallic coupling, the mating parts, and the surrounding architecture of the shaft, which may in turn reduce raw material costs for each component as well as an overall weight of the gas turbine engine.

With the method described herein; it is also possible to decouple any axial restraint mechanism from the shaft. Thus, the axial capability of the shaft would remain unaffected and there would be no continued rubbing or frictional effects after the fuse load event. Further, the method may enhance the efficiency of the gas turbine engine. The combination of the composite tube with the metallic coupling may provide the lightweight shaft and the stiffer alternative to a conventional all steel driveshaft.

In some embodiments, the at least one metallic coupling includes a plurality of metallic couplings. The method further includes disposing the plurality of metallic couplings spaced apart from each other relative to the longitudinal axis of the shaft, such that each of the plurality of splines of each of the plurality of metallic couplings is received within and engages with the corresponding groove of the composite tube to form the preloaded interference fit between the load fuse mechanism and the composite tube.

In an example, the shaft may include a pair of metallic couplings disposed at either ends of the composite tube. In another example, the shaft may include a pair of metallic couplings that may be spaced apart from either ends of the composite tube. Each metallic coupling may maintain the structural integrity of the shaft during fuse load events.

As used herein, the terms "first", "second", and "third" are used as identifiers. Therefore, such terms should not be construed as limiting of this disclosure. The terms "first", "second" and "third", when used in conjunction with a feature or an element can be interchanged throughout the embodiments of this disclosure.

It will be understood that the present disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

As used herein, the terms "first", "second", and "third" are used as identifiers. Therefore, such terms should not be construed as limiting of this disclosure. The terms "first", "second" and "third", when used in conjunction with a feature or an element can be interchanged throughout the embodiments of this disclosure.

Figure 1:
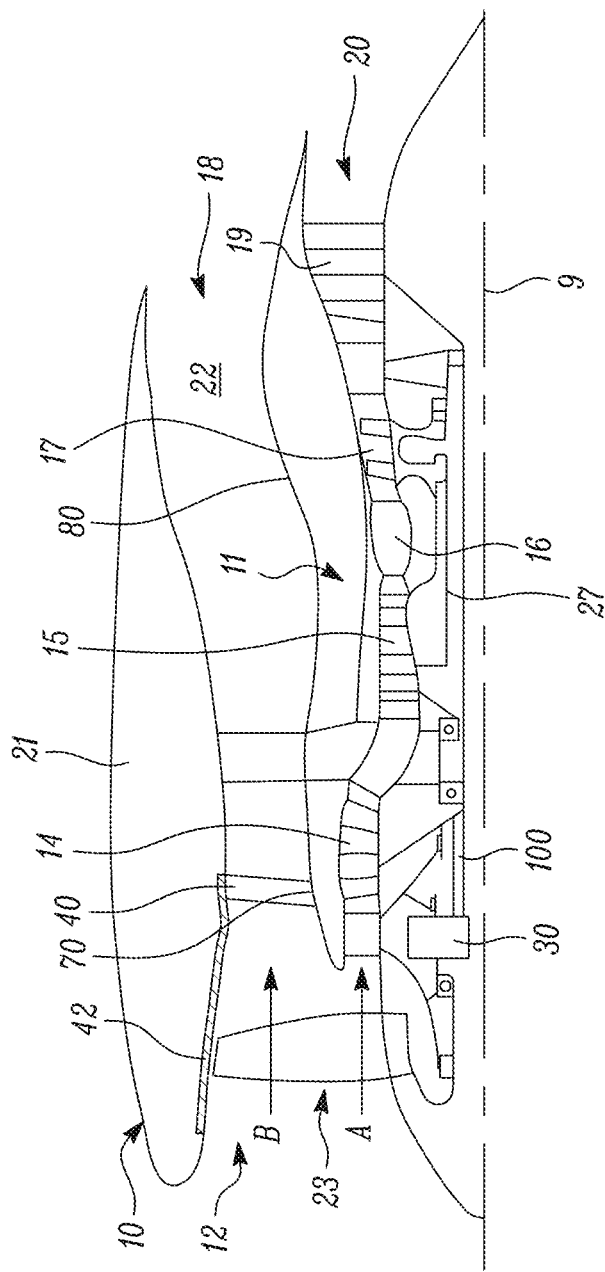
FIG. 1 is a schematic side view of a gas turbine engine.

FIG. 1 illustrates a schematic side view of a gas turbine engine 10 having a principal rotational axis 9. The gas turbine engine 10 comprises an air intake 12 and a propulsive fan 23 that generates two airflows: a core airflow A and a bypass airflow B. The gas turbine engine 10 comprises an engine core 11 that receives the core airflow A. In other words, the core airflow A enters the engine core 11. The fan 23 is located upstream of the engine core 11. The fan 23 includes a plurality of blades (not shown herein) that upon rotating, generates the core airflow A and the bypass airflow B. The engine core 11 comprises, in axial flow series, a compressor, a combustor, and a turbine. Specifically, the engine core 11 comprises, in axial flow series, a low pressure compressor 14, a high pressure compressor 15, a combustor 16, a high pressure turbine 17, a low pressure turbine 19, and a core exhaust nozzle 20. A nacelle 21 surrounds the gas turbine engine and defines a bypass duct 22 and a bypass exhaust nozzle 18. The bypass airflow B flows through the bypass duct 22 surrounding the engine core 11. The bypass airflow B flows through the bypass duct 22 to provide propulsive thrust, where it is straightened by a row of outer guide vanes 40 before exiting the bypass exhaust nozzle 18. The outer guide vanes 40 extend radially outwardly from an inner ring 70 which defines a radially inner surface of the bypass duct 22. Rearward of the outer guide vanes 40, the engine core 11 is surrounded by an inner cowl 80 which provides an aerodynamic fairing defining an inner surface of the bypass duct 22. The inner cowl 80 is rearwards of and axially spaced from the inner ring 70. A fan case 42 defines an outer surface of the bypass duct 22. The inner ring 70 defines the inner surface of the bypass duct 22 towards the rear of the fan case 42. The gas turbine engine 10 includes a shaft 100. The fan 23 is attached to and driven by the low pressure turbine 19 via the shaft 100 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. A core shaft 27 connects the turbine 17, 19 to the compressor 14, 15. Specifically, the high pressure turbine 17 drives the high pressure compressor 15 by the suitable core shaft 27 or an interconnecting shaft. The fan 23 generally provides the majority of the propulsive thrust. The epicyclic gearbox 30 is a reduction gearbox.

Figure 2:
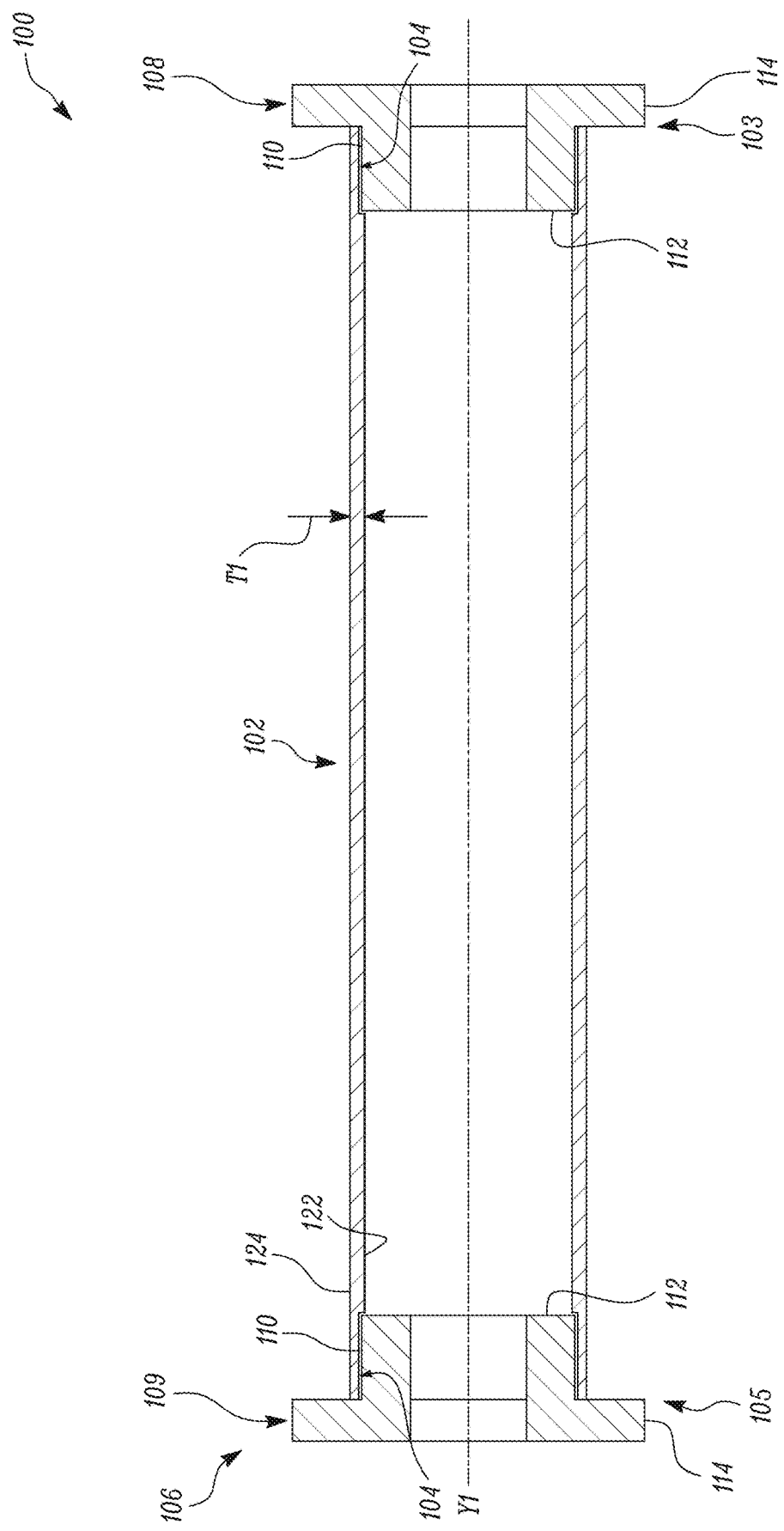
FIG. 2 is a schematic sectional view of a shaft of the gas turbine engine of FIG. 1, according to an embodiment of the present disclosure.

FIG. 2 is a schematic perspective view of the shaft 100 of the gas turbine engine 10 of FIG. 1, according to an embodiment of the present disclosure. It should be noted that the shaft 100 described herein is not limited to use in geared engines, such as the gas turbine engine 10 having the gearbox 30. Accordingly, the shaft 100 can be used in direct drive engines that do not include the gearbox 30.

The shaft 100 includes a composite tube 102. The composite tube 102 defines a first end 103 and a second end 105 opposite the first end 103. The composite tube 102 defines a radial thickness T1. The composite tube 102 defines an inner surface 122 and an outer surface 124. In some embodiments, the composite tube 102 is made of a carbon composite material or a glass fibre composite material. In some other examples, the composite tube 102 may be made of any form of matrix including, but not limited to, epoxy, Bismaleimide (BMI), cyanate ester, and the like. Further, the composite tube 102 may have any composite construction, layup, or fibre direction. For example, the composite tube 102 may include a filament wound structure, a braided structure, a structure with fibres placed radially in any angular arrangement, a chopped strand mat structure, and the like. The design of the composite tube 102 described herein may work with carbon composite, glass fibre composite, or any other composites, where electrical isolation or galvanic protection is needed.

The composite tube 102 includes a stepped design at each of the first and second ends 103, 105. The composite tube 102 includes a plurality of grooves 104 extending along a longitudinal axis Y1 of the shaft 100. In the illustrated embodiment of FIG. 2, the plurality of grooves 104 are disposed at either ends 103, 105 of the composite tube 102.

The shaft 100 further includes a load fuse mechanism 106 including at least one metallic coupling 108, 109. The at least one metallic coupling 108, 109 includes a plurality of metallic couplings 108, 109 spaced apart from each other relative to the longitudinal axis Y1 of the shaft 100. Specifically, the at least one metallic coupling 108, 109 includes two metallic couplings 108, 109 spaced apart from each other relative to the longitudinal axis Y1 of the shaft 100. Particularly, the metallic couplings 108, 109 are disposed on either ends 103, 105, respectively, of the composite tube 102 opposite to each other relative to the longitudinal axis Y1. The metallic coupling 108 is disposed at the first end 103 of the composite tube 102 and the metallic coupling 109 is disposed at the second end 105 of the composite tube 102. In some embodiments, the at least one metallic coupling 108, 109 is made of steel or titanium. In other embodiments, the at least one metallic coupling 108, 109 may be made of any other metal that exhibits high strength and maintains its structural integrity when subjected to high loads. The shaft 100 may be subjected to a number of loads during operation of the gas turbine engine 10 (see FIG. 1). For example, the shaft 100 may be subjected to a limit load that may include the highest load that could be generated during normal operation of the gas turbine engine 10. Further, the shaft 100 may be subjected to an ultimate load that may include a maximum load that could be generated during a fan blade off event or a fan seizure event, which may result in increase in application of high amounts of torque and bending load. Further, the at least one metallic coupling 108, 109 may be designed to withstand a number of fuse loads generated during a normal operation of the gas turbine engine 10 with no detrimental effect. The fuse load may be defined as a load that is higher than a limit load but less than an ultimate load.

For explanatory purposes, only the metallic coupling 108 disposed at the first end 103 of the shaft 100 will now be explained in detail. However, the details provided herein are equally applicable to the metallic coupling 109 disposed at the second end 105.

Figure 3:
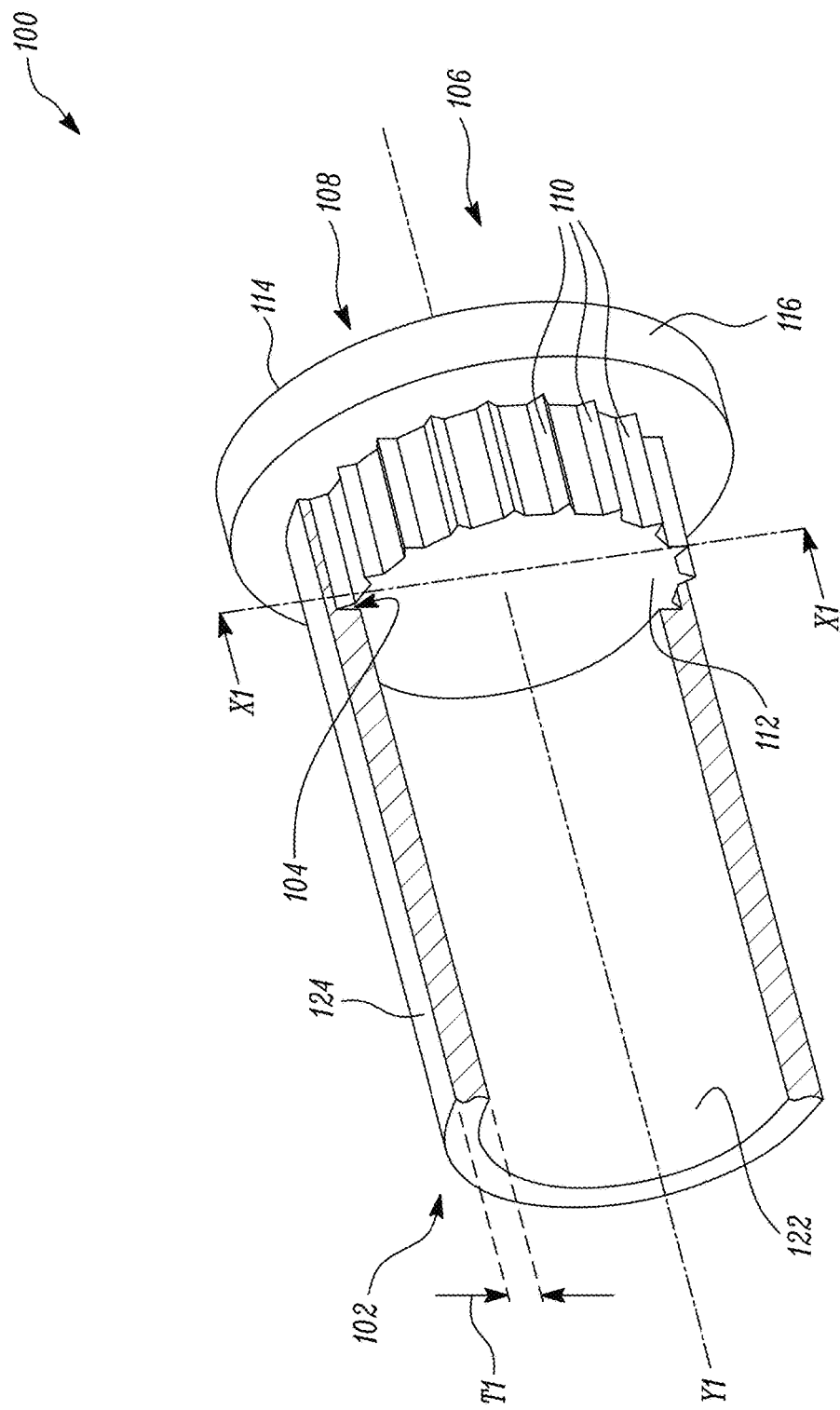
FIG. 3 is a schematic partial sectional view of the shaft of FIG. 2.
Figure 4:
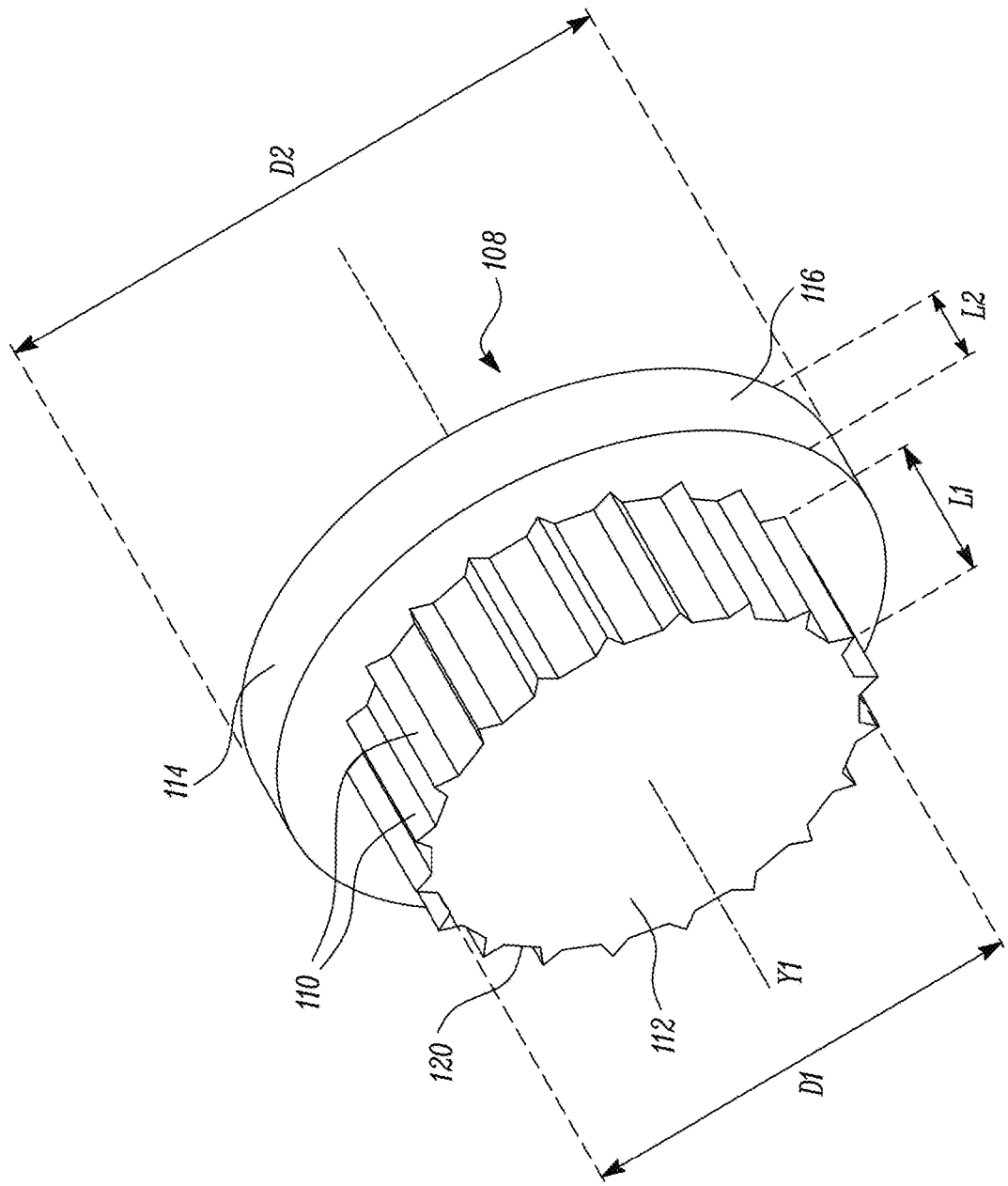
FIG. 4 is a schematic perspective view of a metallic coupling of the shaft of FIGS. 2 and 3.

Referring to FIGS. 3 and 4, the at least one metallic coupling 108 includes a plurality of splines 110 extending along the longitudinal axis Y1 of the shaft 100. The at least one metallic coupling 108 includes a first portion 112 defining a first diameter D1 and a second portion 114 extending from the first portion 112 along the longitudinal axis Y1. The first portion 112 defines a length L1. The second portion 114 defines a second diameter D2 that is greater than the first diameter D1. The second portion 114 has a smooth annular outer surface 116 devoid of any splines 110. The second portion 114 defines a length L2. In some examples, a value of the length L1 of the first portion 112 may be different than a value of the length L2 of the second portion 114. For example, the value of the length L1 may be greater than the value of the length L2. In other examples, the value of the length L1 of the first portion 112 may be similar to the value of the length L2 of the second portion 114.

In the illustrated embodiment of FIGS. 3 and 4, each of the plurality of splines 110 projects radially outwards from the first portion 112. In the illustrated embodiment of FIGS. 3 and 4, each of the plurality of splines 110 extends longitudinally along the length L1 of the first portion 112. Further, the plurality of splines 110 are equidistantly spaced apart from each other along a circumference of the first portion 112.

Referring again to FIG. 2, each of the plurality of splines 110 is received within and engages with a corresponding groove 104 of the composite tube 102 to form a preloaded interference fit between the load fuse mechanism 106 and the composite tube 102. Specifically, each of the plurality of splines 110 of each of the plurality of metallic couplings 108, 109 is received within and engages with the corresponding groove 104 of the composite tube 102 to form the preloaded interference fit between the load fuse mechanism 106 and the composite tube 102. In some examples, each of the plurality of splines 110 of each of the plurality of metallic couplings 108, 109 may be press fitted into the corresponding groove 104 of the composite tube 102. Further, in the illustrated embodiment of FIG. 2, a total number of the grooves 104 corresponds to a total number of the splines 110. Such an arrangement may allow each spline 110 to re-lock with the corresponding groove 104 when the composite tube 102 slides past the spline 110 during a fuse load event.

An interface between the composite tube 102 and the metallic couplings 108, 109 are in the form of the splines 110 machined into the metallic couplings 108, 109. The splines 110 form an interference fit with the grooves 104 of the composite tube 102. The interface may be machined to size allowing a desired level of interference and therefore the preloaded interference fit may be controlled accurately. The preloaded interference fit may have a high impact on a torque carrying capability of the interface. When subjected to the fuse load, the composite tube 102 may slip over the spline 110 of the metallic couplings 108, 109, while maintaining the structural integrity of the shaft 100 other than a relatively small amount of wear at the interface.

The preloaded interference fit between the load fuse mechanism 106 and the composite tube 102 may be designed to withstand the fuse load. When the shaft 100 experiences the fuse load, the composite tube 102 may slide by indexing past the spline 110 on the metallic coupling 108, 109. Thus, due to the design of the shaft 100, a failure that may generate due to the limit load and the ultimate load may not propagate into a remainder of the shaft 100, which may in turn prevent separation/failure of the shaft 100 and potential release of debris. The preloaded interference fit between the load fuse mechanism 106 and the composite tube 102 may protect mating parts associated with the shaft 100 and a surrounding architecture of the shaft 100 from the ultimate load.

Further, the preloaded interference fit between the metallic coupling 108, 109 and the composite tube 102 may retain a structural integrity of the shaft 100 by sliding/indexing of the composite tube 102 with respect to the metallic coupling 108, 109. The preloaded interference fit may also maintain an axial capability of the shaft 100 and may prevent a frictional effect that may be caused due to sliding of the composite tube 102 past the metallic coupling 108, 109.

Further, a value of the fuse load is a design characteristic of the preloaded interference fit at the interface of the composite tube 102 and the metallic couplings 108, 109. The remainder of the composite tube 102, the metallic couplings 108, 109, the mating parts, and the surrounding architecture of the shaft 100 only need to react to the fuse load and not the ultimate load. Such reduced load requirements may result in weight saving across the composite tube 102, the metallic couplings 108, 109, the mating parts, and the surrounding architecture of the shaft 100, which may in turn reduce raw material costs for each component well as an overall weight of the gas turbine engine 10 (see FIG. 1).

With the design of the shaft 100 described herein; it is also possible to decouple any axial restraint mechanism from the shaft 100. Thus, an axial capability of the shaft 100 would remain unaffected and there would be no continued rubbing or frictional effects after the fuse load event. Further, the load fuse mechanism 106 may enhance an efficiency of the gas turbine engine 10. The combination of the composite tube 102 with the metallic couplings 108, 109 may provide a lightweight shaft 100 and a stiffer alternative to a conventional all steel driveshaft.

Figure 5:
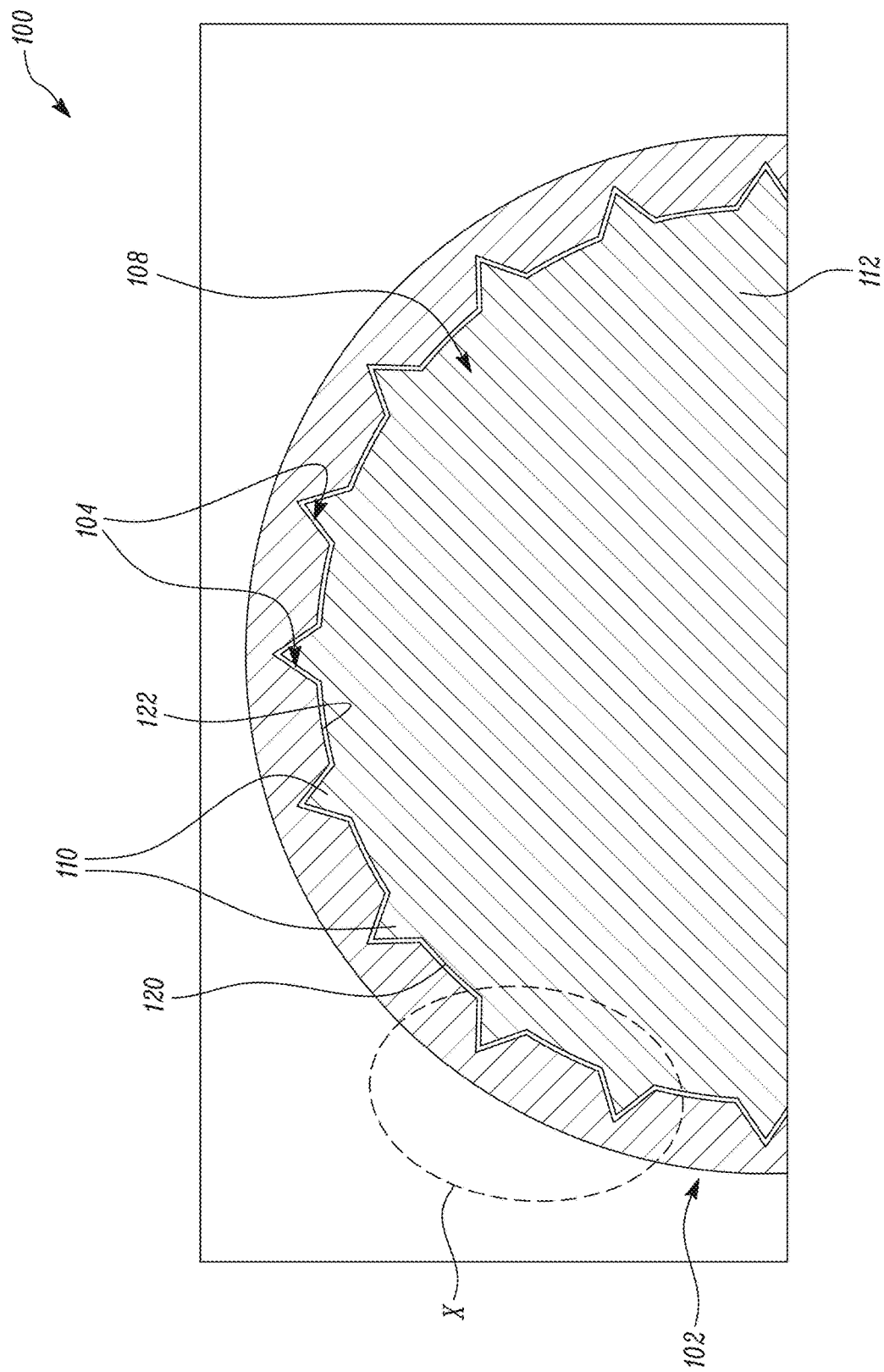
FIG. 5 is a schematic sectional side view of the metallic coupling received within a composite tube of the shaft of FIGS. 2 and 3.

FIG. 5 is a schematic sectional side view of the metallic coupling 108 received within the composite tube 102 along a plane X1 shown in FIG. 3, according to an embodiment of the present disclosure. In the illustrated embodiment of FIG. 5, each of the plurality of the splines 110 extends from an outer surface 120 of the first portion 112 and each of the plurality of grooves 104 extends from the inner surface 122 of the composite tube 102, such that the at least one metallic coupling 108 is received within the composite tube 102. Further, a shape of each of the plurality of grooves 104 is complementary to a cross-sectional shape of each of the plurality of splines 110. In the illustrated embodiment of FIG. 5, each of the plurality of splines 110 has a triangular cross-section. Further, each of the plurality of grooves 104 has a triangular shape. The triangular shape of the each of the plurality of splines 110 may allow radial movement of the composite tube 102 relative to the metallic coupling 108. In other embodiments, each of the plurality of splines 110 may have a square cross-section or a rectangular cross section similar to the cross-section of the plurality of grooves 104 based on application attributes. The shape of each of the plurality of splines 110 and the plurality of grooves 104 may facilitate the preloaded interference fit between the metallic coupling 108 and the composite tube 102.

During the fuse load event, the composite tube 102 may slide past the splines 110 extending from the outer surface 120 of the first portion 112 of the at least one metallic coupling 108, such that the sliding of the composite tube 102 may prevent failure of the shaft 100.

Figure 6:
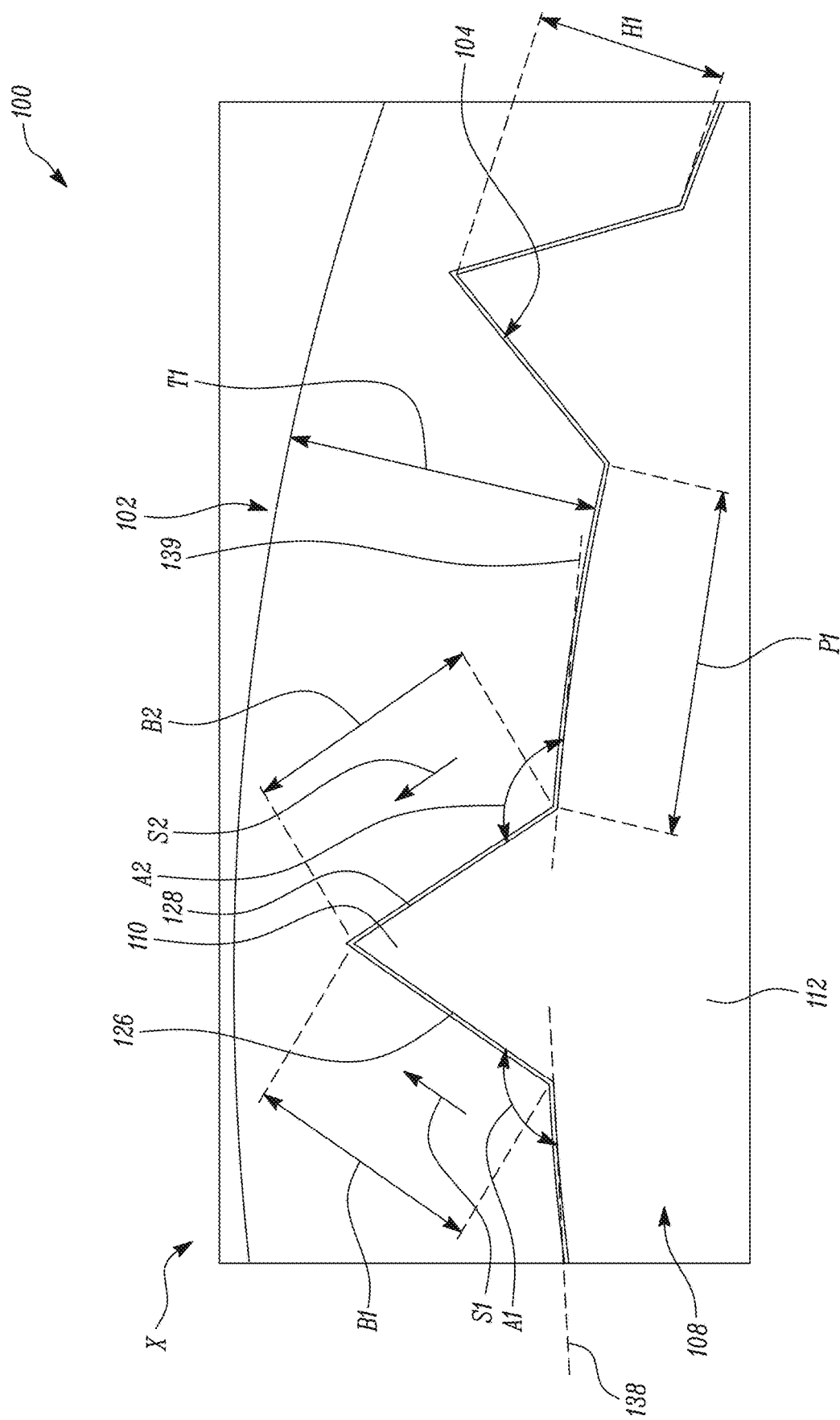
FIG. 6 is an enlarged schematic view of a section X of the shaft shown in FIG. 5.

FIG. 6 is an enlarged schematic view of a section X (shown in FIG. 5) of the shaft 100 of the FIG. 2, according to an embodiment of the present disclosure. In some embodiments, each of the plurality of splines 110 defines a first side surface 126 and a second side surface 128 extending angularly from the first side surface 126. The first side surface 126 extends along a first direction S1 that is disposed at a first spline angle A1 relative to a tangent 138 to the first portion 112. The first side surface 126 defines a first length B1 along the first direction S1.

The second side surface 128 extends along a second direction S2 that is disposed at a second spline angle A2 relative to a tangent 139 to the first portion 112. In some embodiments, each of the first spline angle A1 and the second spline angle A2 lies from 15 degrees to 75 degrees. In some examples, each of the first spline angle A1 and the second spline angle A2 lies from 30 degrees to 60 degrees. The second side surface 128 defines a second length B2 along the second direction S2. In the illustrated embodiment of FIG. 6, the first length B1 is equal to the second length B2. Thus, each spline 110 has a symmetric profile which may allow the composite tube 102 to slide smoothly over the plurality of splines 110 of the metallic coupling 108 during the fuse load event. Further, as the splines 110 have the symmetric profile, the shaft 100 may be rotatable in any direction. In other examples, the spline 110 may have a non-symmetrical shape, for example, the first length B1 and the second length B2 may be different from each other.

The first side surface 126, the second side surface 128, the first spline angle A1 and the second spline angle A2 may allow the composite tube 102 to slide smoothly over the plurality of splines 110 of the metallic coupling 108 during the fuse load event.

In some embodiments, a circumferential pitch P1 defined between two adjacent splines 110 of the plurality of splines 110 is from 200% to 2000% of a radial height H1 of each of the plurality of splines 110. In some embodiments, the circumferential pitch P1 defined between two adjacent splines 110 of the plurality of splines 110 is from 500% to 1000% of the radial height H1 of each of the plurality of splines 110. The circumferential pitch P1 may be decided so as to ensure that shear loads generated by torque transmission do not cause failure of the composite tube 102 at the interface.

In some embodiments, the radial height H1 of each of the plurality of splines 110 is at least 0.1 millimeter (mm). The radial height H1 of the plurality of splines 110 may be decided such that the composite tube 102 may easily slide over the splines 110 during the fuse load event.

In some embodiments, the radial height H1 of each of the plurality of splines 110 is from 0.1% to 5% of the first diameter D1 (shown in FIG. 4) of the first portion 112. This feature of the splines 110 may control the additional strain that the composite tube 102 needs to withstand when passing over the splines 110.

In some embodiments, the radial height H1 of each of the plurality of splines 110 is from 0.5% to 25% of the radial thickness T1 of the composite tube 102. This feature of the splines 110 may control a local bending strain that the composite tube 102 needs to withstand when passing over the splines 110. In some embodiments, the radial height H1 of each of the plurality of splines 110 is from 1.5% to 10% of the radial thickness T1 of the composite tube 102.

Figure 7:
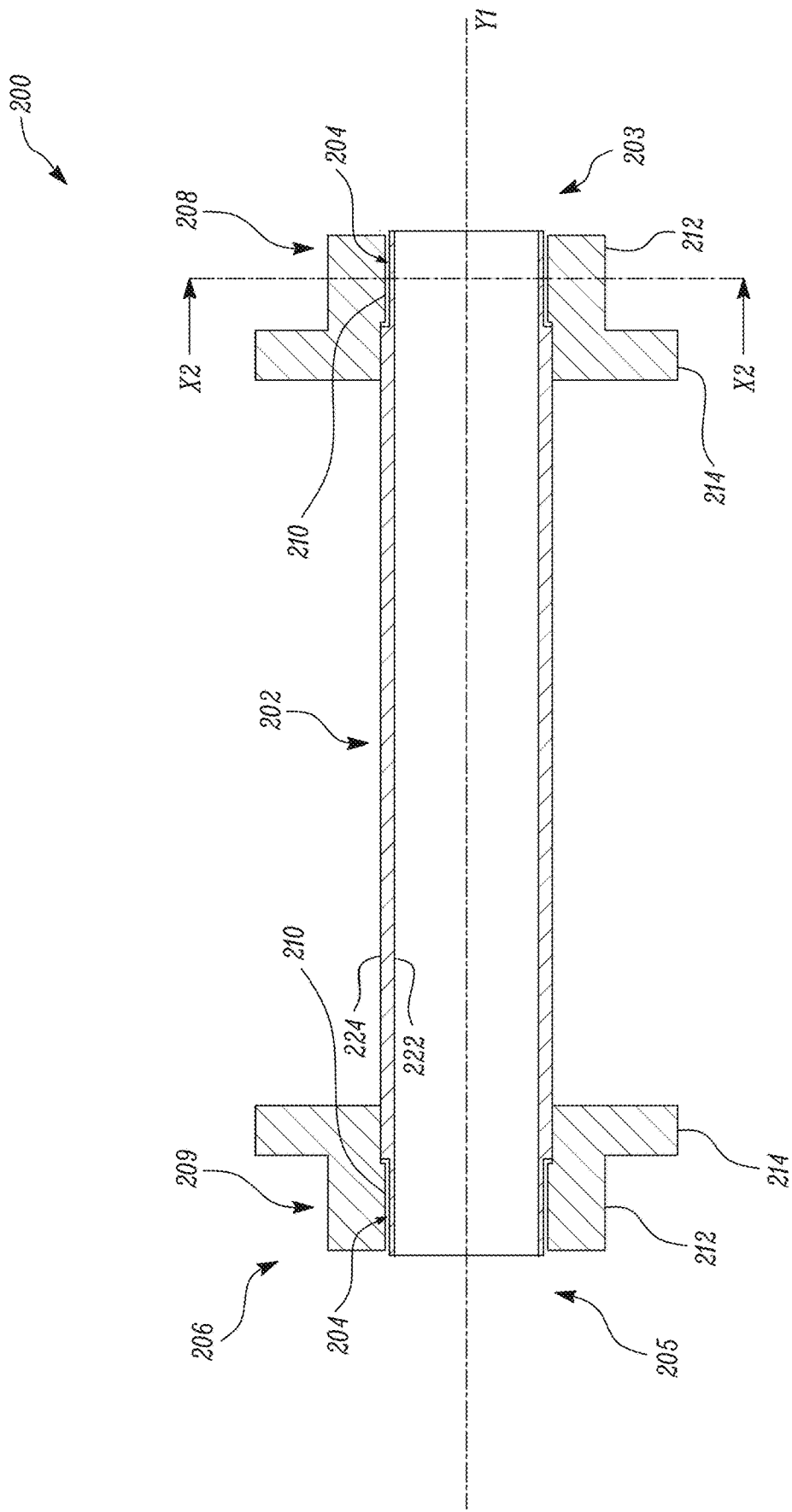
FIG. 7 is a schematic sectional view of a shaft, according to another embodiment of the present disclosure.

FIG. 7 is a schematic sectional view of a shaft 200, according to another embodiment of the present disclosure. The shaft 200 is substantially and functionally equivalent to the shaft 100 illustrated in FIGS. 2 to 6, with common components being referred to by the same reference numerals. The shaft 200 includes a composite tube 202. The composite tube 202 may be substantially similar to the composite tube 102 (shown in FIG. 2). The composite tube 202 defines a first end 203 and a second end 205 opposite the first end 203. The composite tube 202 defines an inner surface 222 and an outer surface 224. The composite tube 202 includes a plurality of grooves 204 extending along the longitudinal axis Y1 of the shaft 200.

The shaft 200 further includes a load fuse mechanism 206 including at least one metallic coupling 208, 209. The at least one metallic coupling 208, 209 includes a plurality of metallic couplings 208, 209 spaced apart from each other relative to the longitudinal axis Y1 of the shaft 200. Specifically, the at least one metallic coupling 208, 209 includes two metallic couplings 208, 209 spaced apart from each other relative to the longitudinal axis Y1 of the shaft 200. Particularly, the metallic coupling 208 is spaced apart from the first end 203 and the metallic coupling 209 is spaced apart from the second end 205 of the composite tube 202 The metallic couplings 208, 209 are substantially similar to the metallic couplings 108, 109 (shown in FIG. 2).

Each of the metallic couplings 208, 209 includes a plurality of splines 210 extending along the longitudinal axis Y1 of the shaft 200. Each of the metallic couplings 208, 209 defines a first portion 212 and a second portion 214. In some examples, the metallic coupling 208 may include splines 210 at its outer surface to engage with a component, such as, carrier shaft splines of the gas turbine engine 10 (see FIG. 1). In some examples, the metallic coupling 209 may include splines at its outer surface to engage with a component, such as, fan splines of the gas turbine engine 10.

Figure 8:
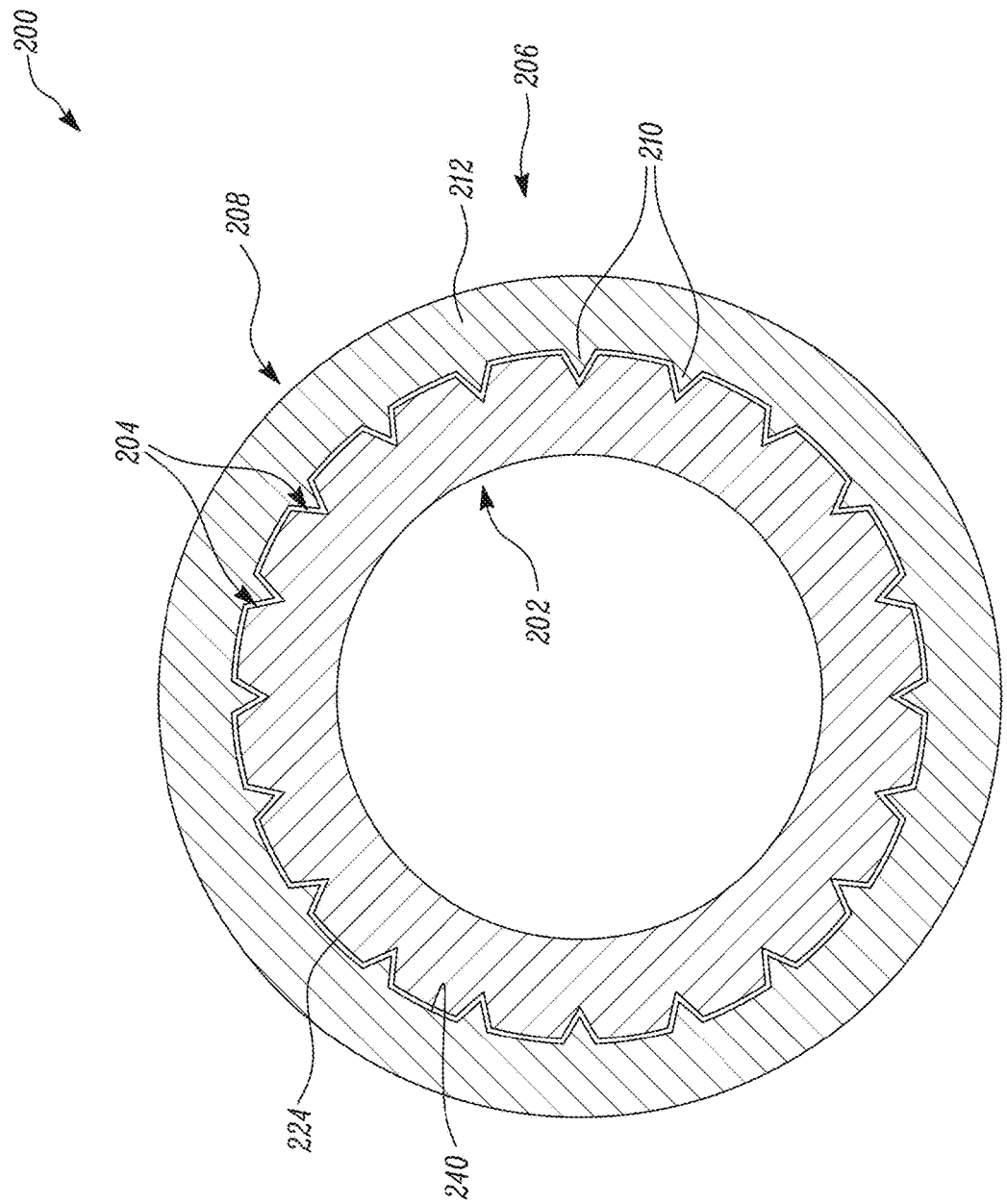
FIG. 8 is a schematic sectional side view of the shaft of FIG. 7.

FIG. 8 is a schematic sectional side view of the shaft 200 of FIG. 7 along a plane X2. In the illustrated embodiment of FIG. 8, each of the plurality of the splines 210 of the metallic couplings 208, 209 extends from an inner surface 240 of the first portion 212 and each of the plurality of grooves 204 extends from the outer surface 224 of the composite tube 202, such that the composite tube 202 is received within the at least one metallic coupling 208, 209. Specifically, the grooves 204 communicate with the outer surface 224 of the composite tube 202.

During the fuse load, the composite tube 202 may slide past the splines 210 extending from the inner surface 240 of the first portion 212 of the at least one metallic coupling 208, 209, such that the sliding of the composite tube 202 may prevent failure of the shaft 200.

The gas turbine engine 10 (see FIG. 1) having the shafts 100 or 200 as shown in FIGS. 2 to 8 may have a reduced overall weight and may be cost-effective in terms of manufacturing and serviceability.

Figure 9:
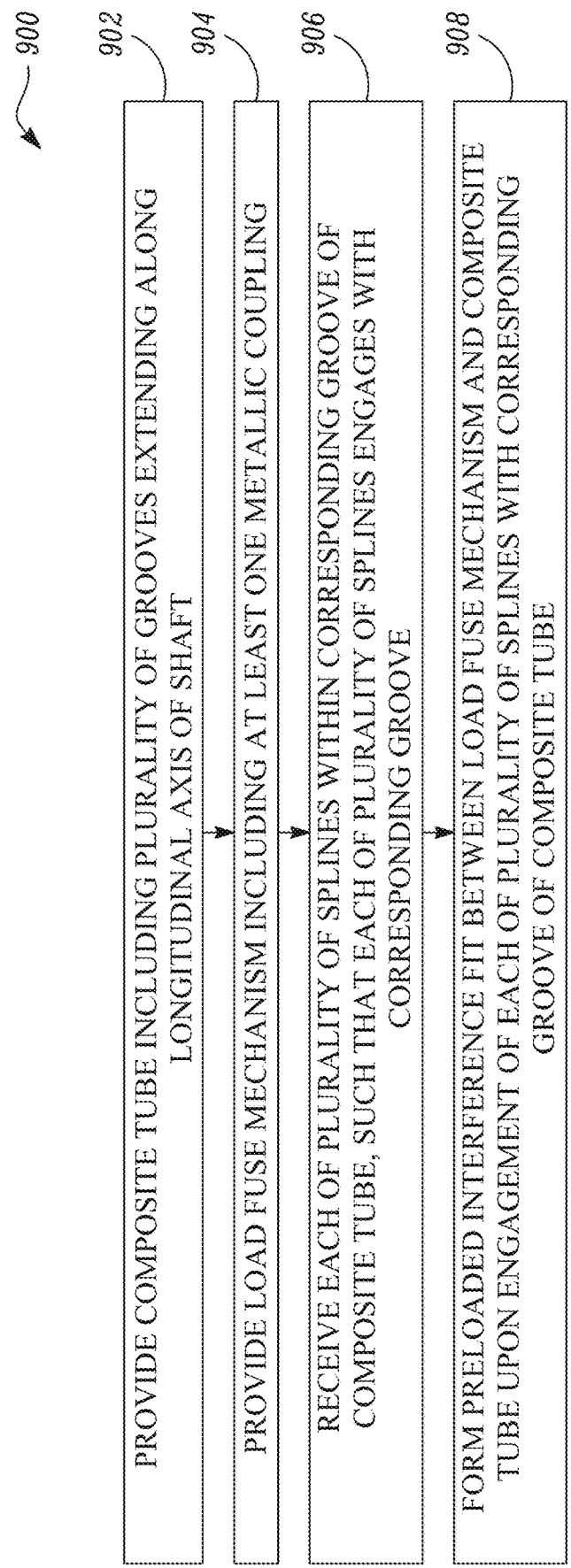
FIG. 9 is a flowchart for a method of manufacturing the shaft for the gas turbine engine of FIG. 1, according to an embodiment of the present disclosure.

FIG. 9 is a flowchart for a method 900 of manufacturing the shaft 100, 200 for the gas turbine engine 10, according to an embodiment of the present disclosure. With reference to FIGS. 1 to 9, at step 902, the composite tube 102, 202 is provided. The composite tube 102, 202 includes the plurality of grooves 104, 204 extending along the longitudinal axis Y1 of the shaft 100, 200.

At step 904, the load fuse mechanism 106, 206 is provided. The load fuse mechanism 106, 206 includes the at least one metallic coupling 108, 109, 208, 209. The at least one metallic coupling 108, 109, 208, 209 includes the plurality of splines 110, 210 extending along the longitudinal axis Y1 of the shaft 100, 200.

At step 906, each of the plurality of splines 110, 210 is received within the corresponding groove 104, 204 of the composite tube 102, 202, such that each of the plurality of splines 110, 210 engages with the corresponding groove 104, 204.

At step 908, the preload interference fit is formed between the load fuse mechanism 106, 206 and the composite tube 102, 202 upon engagement of each of the plurality of splines 110, 210 with the corresponding groove 104, 204 of the composite tube 102, 202.

Further, the at least one metallic coupling 108, 109, 208, 209 includes the plurality of metallic couplings 108, 109, 208, 209. The method 900 further includes a step of disposing the plurality of metallic couplings 108, 109, 208, 209 spaced apart from each other relative to the longitudinal axis Y1 of the shaft 100, 200, such that each of the plurality of splines 110, 210 of each of the plurality of metallic couplings 108, 109, 208, 209 is received within and engages with the corresponding groove 104, 204 of the composite tube 102, 202 to form the preloaded interference fit between the load fuse mechanism 106, 206 and the composite tube 102, 202.

It will be understood that the present disclosure is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A shaft for a gas turbine engine, the shaft comprising:
   a composite tube including a plurality of grooves extending along a longitudinal axis of the shaft; and
   a load fuse mechanism including at least one metallic coupling that includes a plurality of splines extending along the longitudinal axis of the shaft, and each of the plurality of splines is received within and engages with a corresponding groove of the composite tube to form a preloaded interference fit between the load fuse mechanism and the composite tube;
   wherein the at least one metallic coupling includes a first portion defining a first diameter and a second portion extending from the first portion along the longitudinal axis, the second portion defines a second diameter that is greater than the first diameter, the second portion has a smooth annular outer surface devoid of any splines, each of the plurality of splines projects radially outwards from the first portion, and a circumferential pitch defined between a respective base of two adjacent splines of the plurality of splines is between 200% to 2000% of a radial height of each of the plurality of splines, wherein the plurality of splines are sized to slip relative to the plurality of grooves and index each of the plurality of splines to another one of the plurality of grooves in response to a torque load applied to the fuse load mechanism exceeding a predetermined fuse load threshold and to reestablish connection between the composite tube and the load fuse mechanism upon reduction of the torque load applied to the fuse load dropping below the predetermined fuse load threshold so as to avoid a torque load that exceed the predetermined fuse load from being applied to the composite tube, thereby protecting the tube from degradation due to torque spikes.

2. The shaft of claim 1, wherein each of the plurality of splines extends longitudinally along a length of the first portion.

3. The shaft of claim 1, wherein the plurality of splines are equidistantly spaced apart from each other along a circumference of the first portion.

4. The shaft of claim 1, wherein each of the plurality of splines defines a first side surface and a second side surface extending angularly from the first side surface, wherein the first side surface extends along a first direction that is disposed at a first spline angle relative to a tangent to the first portion, wherein the second side surface extends along a second direction that is disposed at a second spline angle relative to a tangent to the first portion, and wherein each of the first spline angle and the second spline angle lies from 15 degrees to 75 degrees.

5. The shaft of claim 4, wherein the first side surface defines a first length along the first direction, wherein the second side surface defines a second length along the second direction, and the first length is equal to the second length.

6. The shaft of claim 1, wherein each of the plurality of the splines extends from an outer surface of the first portion and each of the plurality of grooves extends from an inner surface of the composite tube, such that the at least one metallic coupling is received within the composite tube.

7. The shaft of claim 1, wherein each of the plurality of the splines extends from an inner surface of the first portion and each of the plurality of grooves extends from an outer surface of the composite tube, such that the composite tube is received within the at least one metallic coupling.

8. The shaft of claim 1, wherein the radial height of each of the plurality of splines is at least 0.1 millimeter.

9. The shaft of claim 1, wherein the radial height of each of the plurality of splines is from 0.1% to 5% of the first diameter of the first portion.

10. The shaft of claim 1, wherein the radial height of each of the plurality of splines is from 0.5% to 25% of a radial thickness of the composite tube.

11. The shaft of claim 1, wherein the at least one metallic coupling is made of steel or titanium.

12. The shaft of claim 1, wherein the composite tube is made of a carbon composite material or a glass fibre composite material.

13. The shaft of claim 1, wherein a shape of each of the plurality of grooves is complementary to a cross-sectional shape of each of the plurality of splines.

14. The shaft of claim 1, wherein each of the plurality of splines has a triangular cross-section.

15. The shaft of claim 1, wherein the at least one metallic coupling comprises a plurality of metallic couplings spaced apart from each other relative to the longitudinal axis of the shaft, and wherein each of the plurality of splines of each of the plurality of metallic couplings is received within and engages with the corresponding groove of the composite tube to form the preloaded interference fit between the load fuse mechanism and the composite tube.

16. A gas turbine engine including the shaft of claim 1.

17. A method of manufacturing a shaft for a gas turbine engine, the method comprising the steps of:
providing a composite tube including a plurality of grooves extending along a longitudinal axis of the shaft;
providing a load fuse mechanism including at least one metallic coupling, wherein the at least one metallic coupling includes a plurality of splines extending along the longitudinal axis of the shaft;
receiving each of the plurality of splines within a corresponding groove of the composite tube, such that each of the plurality of splines engages with the corresponding groove; and
forming a preloaded interference fit between the load fuse mechanism and the composite tube upon engagement of each of the plurality of splines with the corresponding groove of the composite tube,
wherein the plurality of splines are sized to slip relative to the plurality of grooves and index each of the plurality of splines to another one of the plurality of grooves in response to a torque load applied to the fuse load mechanism exceeding a predetermined fuse load threshold and to reestablish connection between the composite tube and the load fuse mechanism upon reduction of the torque load applied to the fuse load dropping below the predetermined fuse load threshold so as to avoid a torque load that exceed the predetermined fuse load from being applied to the composite tube, thereby protecting the tube from degradation due to torque spikes.

18. The method of claim 17, wherein the at least one metallic coupling includes a plurality of metallic couplings, the method further comprising disposing the plurality of metallic couplings spaced apart from each other relative to the longitudinal axis of the shaft, such that each of the plurality of splines of each of the plurality of metallic couplings is received within and engages with the corresponding groove of the composite tube to form the preloaded interference fit between the load fuse mechanism and the composite tube.

* * * * *